April 26, 1949.　　　　R. W. KANGAS　　　　2,468,559
FLUID PROPELLED AIRPLANE

Filed Oct. 26, 1944　　　　　　　　　　3 Sheets-Sheet 1

Inventor

Ray W. Kangas

By Clarence A. O'Brien
and Harvey B. Jacobson
Attorneys

April 26, 1949.                R. W. KANGAS                2,468,559
                          FLUID PROPELLED AIRPLANE
Filed Oct. 26, 1944.                                    3 Sheets—Sheet 2
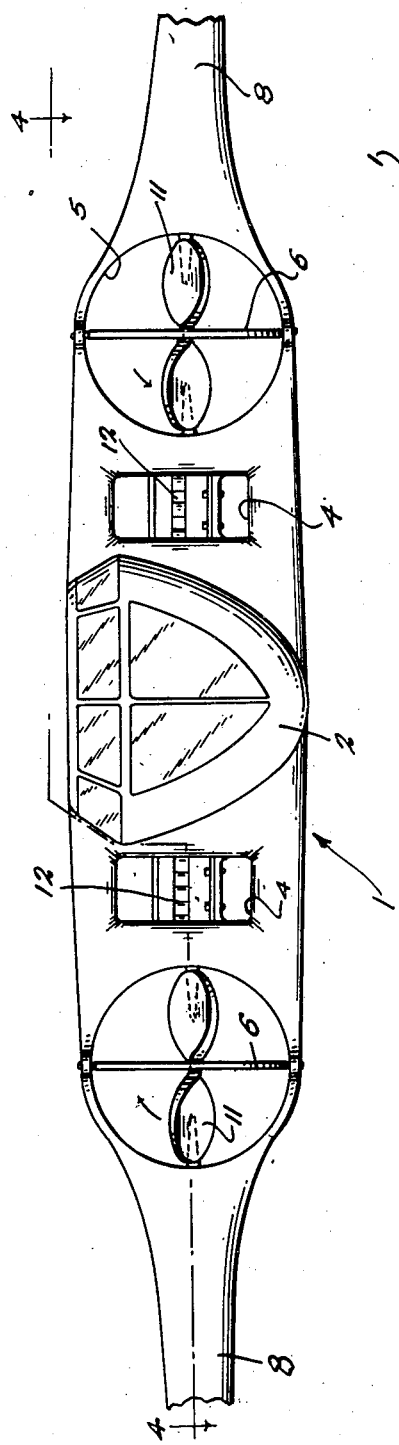
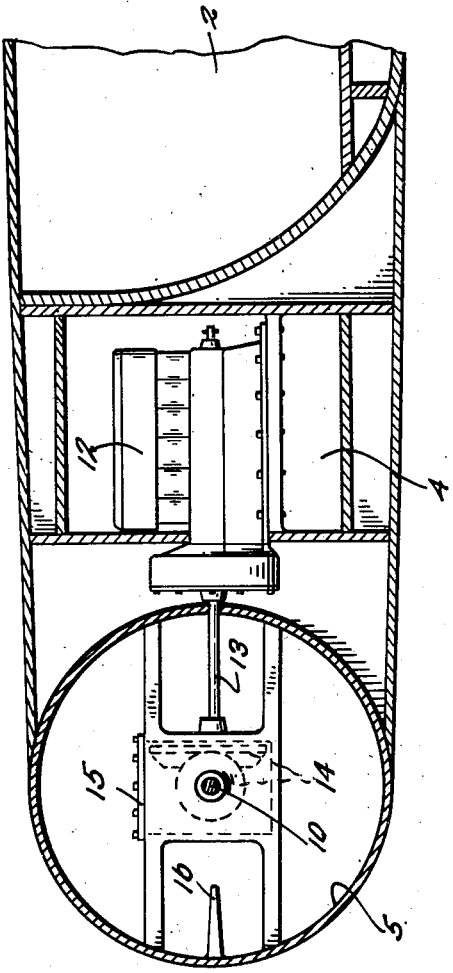
Inventor
Ray W. Kangas
By Clarence A. O'Brien
and Harvey B. Jacobson
Attorneys

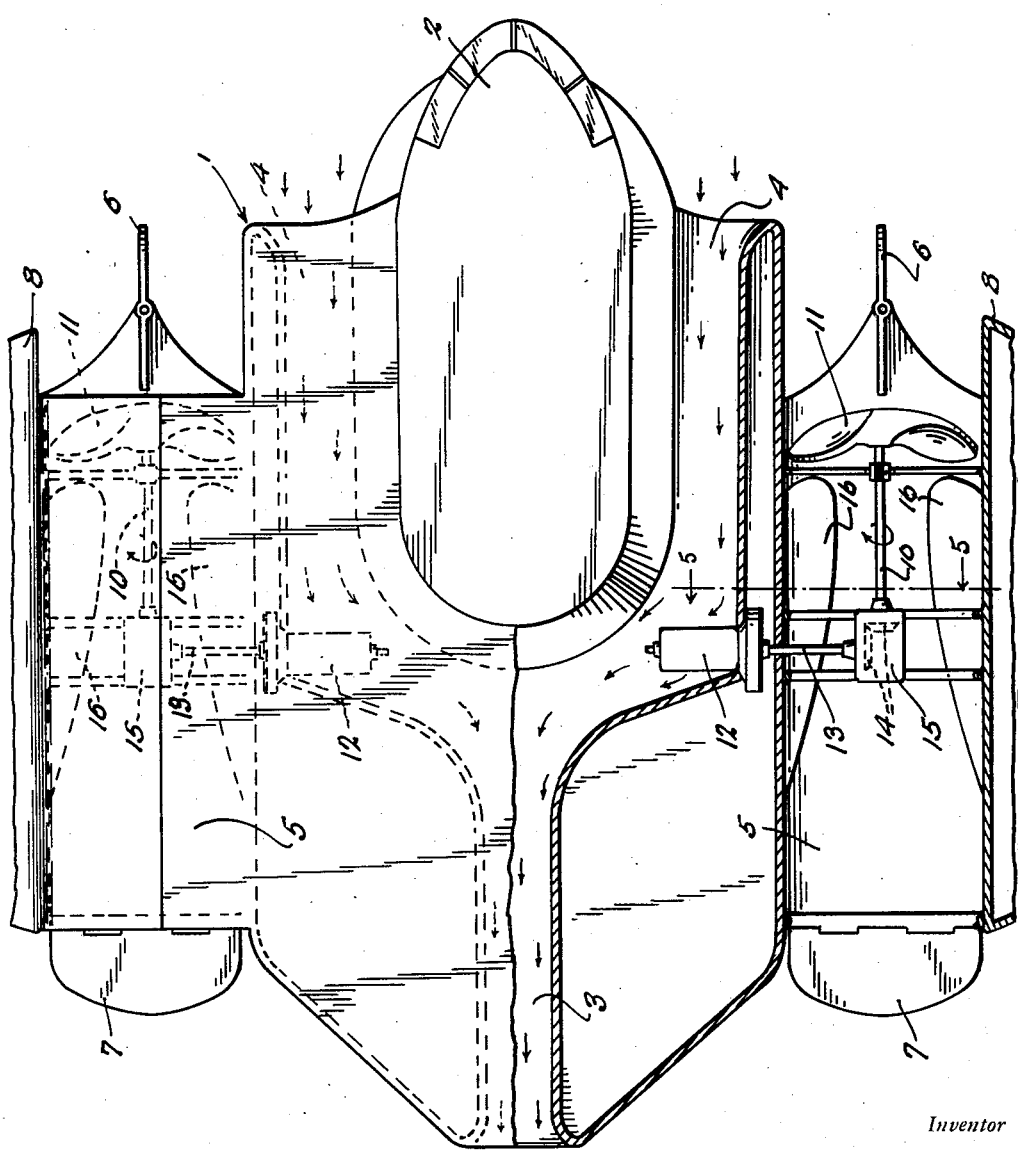

Patented Apr. 26, 1949

2,468,559

UNITED STATES PATENT OFFICE 2,468,559

FLUID-PROPELLED AIRPLANE

Ray W. Kangas, Eveleth, Minn.

Application October 26, 1944, Serial No. 560,411

2 Claims. (Cl. 244—15)

The present invention relates to new and useful improvements in airplanes, and has for its primary object to provide, in a manner as hereinafter set forth, a flying machine of this character comprising novel propulsion and control means.

Another very important object of the invention is to provide an airplane of the aforementioned character which embodies a unique construction and arrangement for cooling the engines.

Other objects of the invention are to provide an airplane of the character described which will be comparatively simple in construction, durable, highly efficient and reliable in use, and which may be manufactured at low cost.

All of the foregoing, and still further objects and advantages of the invention will become apparent from a study of the following specification, taken in connection with the accompanying drawing wherein like characters of reference designate corresponding parts throughout the several views, and wherein:

Figure 3 is a front elevational view of the machine with the wings broken away.

Figure 4 is an enlarged top plan view of the machine with the wings broken away, a portion of said machine being shown in horizontal section substantially on the line 4—4 of Figure 1.

Figure 5 is a cross-sectional view, taken substantially on the line 5—5 of Figure 4.

Figure 1:
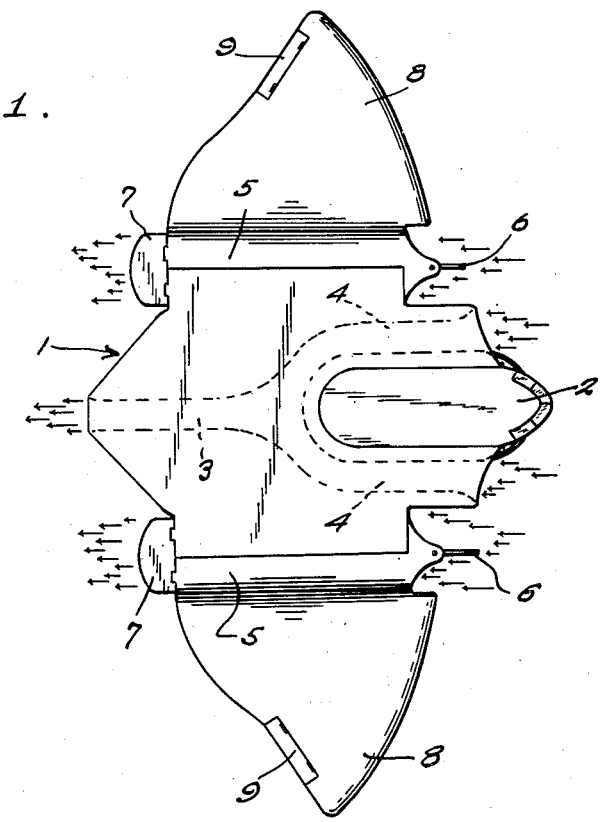
Figure 1 is a top plan view of an airplane constructed in accordance with the present invention.
Figure 2:
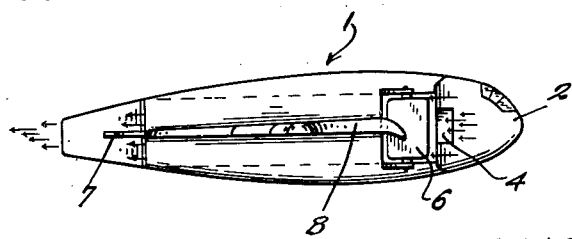
Figure 2 is a view in side elevation thereof.

Referring now to the drawing in detail, it will be seen that the embodiment of the invention which has been illustrated comprises a fuselage which is designated generally by reference numeral 1. Mounted in the front, central portion of the fuselage 1 and projecting forwardly therefrom is a control room or cabin 2. Extending through the fuselage 1 is an air conduit 3 comprising branches 4 which extend along the sides of the control room or cabin 2 to the forward end of said fuselage. The conduit 3 is open at its rear end and the branches 4 thereof are open at their forward ends.

Longitudinal tunnels 5 are provided on the sides of the fuselage 1. Rudders 6 are mounted on the forward end portions of the tunnels 5. Elevators 7 are mounted on the rear ends of the tunnels 5. Any suitable means may be employed for actuating the control surfaces 6 and 7 from the control room or cabin 2 of the plane. Wings 8 project laterally from the tunnels 5. Ailerons 9 are provided on the wings 8.

As illustrated to advantage in Figures 4 and 5 of the drawing, longitudinal shafts 10 are journaled centrally in the forward portions of the tunnels 5. Propellers 11 are fixed on the forward end portions of the shafts 10 for operation in the tunnels 5 rearwardly of the rudders 6. Engines 12 are mounted transversely in the branches 4 of the air conduits 3 in the path of streams of air flowing through said branches. The crankshafts 13 of the engines 12 project transversely into the tunnels 5 and drive the propeller shafts 10 through suitable gears 14 in cases 15 which are provided therefor in said tunnels. Stabilizing fins 16 are mounted longitudinally in the tunnels 5 rearwardly of the propellers 11.

It is thought that the operation of the machine will be readily apparent from a consideration of the foregoing. Briefly, the propellers 11 are driven by the engines 12 for moving the machine forwardly, said propellers drawing air rapidly through the tunnels 6 by which it is confined thereby materially increasing the effectiveness of said propellers. The horizontal flight of the machine is controlled through the medium of the rudders 6 in conjunction with the ailerons 9 while the elevators 7 control the vertical flight of said machine. Streams of air passing rapidly through the branches 4 of the conduit 3 cool the engines 12.

It is believed that the many advantages of a flying machine constructed in accordance with the present invention will be readily understood, and although a preferred embodiment of said machine is as illustrated and described, it is to be understood that changes in the details of construction and in the combination and arrangement of parts may be resorted to which will fall within the scope of the invention as claimed.

What is claimed is:

1. An airplane having a wing, a fuselage, a cabin in the front, central portion of the fuselage, an air conduit in the fuselage opening to the rear of the cabin and having branches adjacent to and surrounding the sides of the cabin and opening at the front of the fuselage, a pair of air tunnels, longitudinally disposed upon each side of the fuselage and rigidly mounted in the wing, an engine mounted transversely in each branch of the air conduit, a crank shaft extending transversely from each engine into the adjacent air tunnel, propellers mounted in the tunnels, means operatively connecting the crank shaft to the propellers, longitudinal, air baffle fins rigidly secured in the tunnels, said tunnels and conduits comprising stabilizing means for the airplane and control surfaces mount in front and rear end portions of the tunnels, in the line of air flow therethrough.

2. An airplane having a wing, a fuselage, a cabin in the front, central portion of the fuselage, an air conduit in the fuselage opening to the rear of the cabin and having branches adjacent to and surrounding the sides of the cabin and opening at the front of the fuselage, a pair of air tunnels, longitudinally disposed upon each side of the fuselage and rigidly mounted in the wing, an engine mounted transversely in each branch of the air conduit, a crankshaft extending transversely from each engine into the adjacent air tunnel, and propellers mounted in the tunnels and operatively connected to said crankshaft.

RAY W. KANGAS.

REFERENCES CITED

The following references are of record in the file of this patent:

UNITED STATES PATENTS

| Number | Name | Date |
|---|---|---|
| 1,106,193 | Deperdussin | Aug. 4, 1914 |
| 1,153,143 | Walker | Sept. 7, 1915 |
| 1,346,993 | Thompson | July 20, 1920 |
| 1,420,509 | Anderson | June 20, 1922 |
| 1,697,770 | Kreikenbohm | Jan. 1, 1929 |
| 2,118,052 | Odor | May 24, 1938 |